United States Patent [19]
Haraguchi et al.

[11] Patent Number: 5,418,841
[45] Date of Patent: May 23, 1995

[54] TELEPHONE ANSWERING MACHINE WITH NON-VOLATILE MEMORY

[75] Inventors: Shinya Haraguchi, Kanagawa; Yoshihito Ichiyama, Tokyo, both of Japan

[73] Assignee: Sony Corporation, Tokyo, Japan

[21] Appl. No.: 968,797

[22] Filed: Oct. 30, 1992

[30] Foreign Application Priority Data

Oct. 31, 1991 [JP] Japan .................. 3-286125

[51] Int. Cl.$^6$ .................. H04M 1/64; H04M 1/00
[52] U.S. Cl. .................. 379/70; 379/2; 379/27; 379/32; 379/67; 379/387; 379/413
[58] Field of Search .................. 379/88, 67, 70, 77, 379/2, 27, 32, 387, 413; 365/228, 226

[56] References Cited

U.S. PATENT DOCUMENTS

| | | | |
|---|---|---|---|
| 4,726,053 | 2/1988 | Mock | 379/70 |
| 4,731,815 | 3/1988 | Hanscom et al. | 379/70 |
| 4,800,533 | 1/1989 | Arakawa | 365/228 |
| 4,815,122 | 3/1989 | Shefler | 379/67 |
| 4,881,205 | 11/1989 | Aihara | 379/88 |
| 4,959,852 | 9/1990 | Kern et al. | 379/88 |
| 5,182,769 | 1/1993 | Yamaguchi et al. | 379/387 |

FOREIGN PATENT DOCUMENTS

| | | |
|---|---|---|
| 0247739A2 | 12/1987 | European Pat. Off. . |
| 0278392A3 | 8/1988 | European Pat. Off. . |
| 2148665 | 10/1983 | United Kingdom . |

OTHER PUBLICATIONS

Patent Abstracts of Japan, vol. 15, No. 355 (E-1109) Sep. 9, 1991 & JP-A-31 39 051 (Toshiba Corporation) Jun. 13, 1991.
Patent Abstracts of Japan, vol. 14, No. 168 (E-912) Mar. 30, 1990 & JP-A-20 23 760 (Toshiba Corporation) Jan. 25, 1990.

Primary Examiner—James L. Dwyer
Assistant Examiner—Fan Tsang
Attorney, Agent, or Firm—Peter C. Toto; Jerry A. Miller

[57] ABSTRACT

An automatically answerable telephone apparatus comprises a control unit having a rewritable memory for storing control data for automatically responding operation and operative to control a line signal processor and a recording and reproducing device, a writable non-volatile memory, a power source for supply a power supply voltage, a capacitor connected for holding the power supply voltage, and a power failure detector, wherein the control unit is operative, with the power supply voltage discharged by the capacitor to remove operating portion other than the control unit and the writable non-volatile memory from the power source and to transfer the control data for automatically responding operation from the rewritable memory to the writable non-volatile memory for preserving the control data when power failure occuring in the power source is detected by the power failure detector.

9 Claims, 2 Drawing Sheets

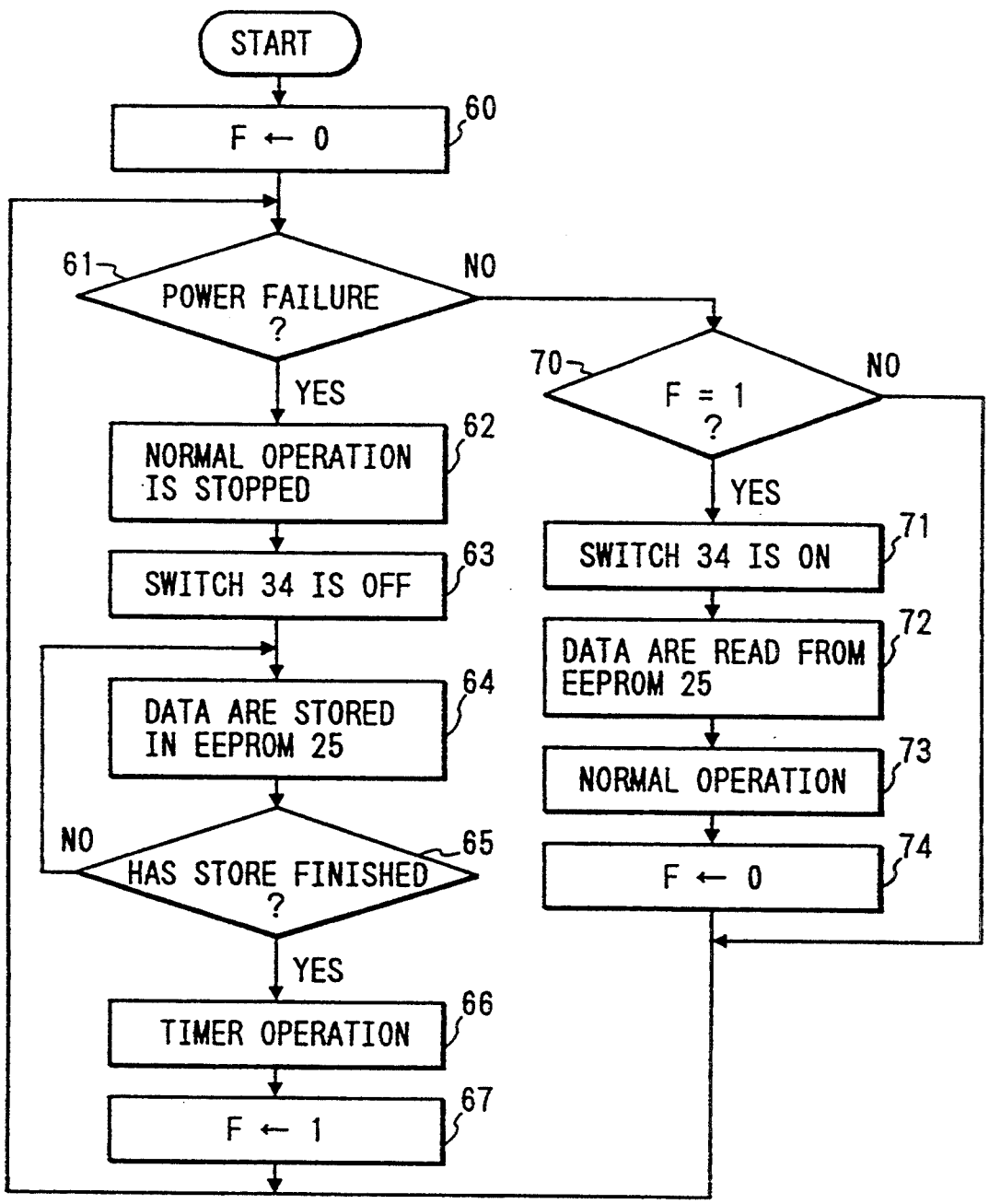

TELEPHONE ANSWERING MACHINE WITH NON-VOLATILE MEMORY

BACKGROUND OF THE INVENTION

1. Field of the Invention

The present invention relates generally to automatically answerable telephone apparatus, and more particularly, is directed to an improvement in a telephone apparatus which is operative to respond automatically to a telephone call received during a person's absence for recording necessary messages from a person on the other end of the line and other information pertaining to the telephone call.

2. Description of the Prior Art

There has been put to practical use various telephone apparatus each operative to respond automatically to a telephone call during a person's absence. Such an automatically responding function of the telephone apparatus is embodied in one of different manners as a function for responding to a ring to transmit one or more respondent messages based on data stored previously in a memory device, such as a random access memory (RAM) or a read only memory (ROM) which is an integrated semiconductor device, a funtion for responding to a ring to transmit a message for recording based on data stored previously in a RAM or ROM and then to cause a built-in cassette tape recording and reproducing device to record on a cassette magnetic tape necessary information pertaining to a message from a person on the other end of the line who responds to the message for recording so that the necessary information can be reproduced later from the cassette magnetic tape, a function for responding to a ring and immediately to cause a built-in cassette tape recording and reproducing device to start its recording operation with the ring for recording on a cassette magnetic tape all message from a person on the other end of the line so that the message can be reproduced later from the cassette magnetic tape, a function for giving a notice to other telephone apparatus or a pocketable ringing device registered previously whenever necessary information pertaining to a message from a person on the other end of the line is recorded on a cassette magnetic tape by a built-in cassette tape recording and reproducing apparatus, and so on. When the automatically responding function described above is performed, the telephone apparatus operates selectively in a responding operation mode for transmitting the respondent message, in an information recording operation mode for recording on the cassette magnetic tape the necessary information pertaining to the massage from a person on the other end of the line, in a message recording operation mode for recording on the cassette magnetic tape all message from a person on the other end of the line, and in a transferring operation mode for giving the notice to other telephone apparatus or the pocketable ringing device registered previously whenever the information pertaining the massage from a person on the other end of the line is recorded on the cassette magnetic tape.

The automatically answerable telephone apparatus constituted as mentioned above has usually a control unit comprising a microcomputer by which various operation controls are carried out and the automatically responding function is also performed under the control by the control unit. The control unit employed in the automatically answerable telephone apparatus is operative, on the occasion of the operation control for the automatically responding function, to store in a RAM provided therein operating condition data representing selectively one of a condition of normal operation and a condition of automatically responding operation, operation mode data representing selectively one of the responding operation mode, the information recording operation mode, the message recording operation mode and the transferring operation mode selected under the condition of automatically responding operation, recorded item number data representing the number of items recorded on the cassette magnetic tape under the information recording operation mode or the message recording operation mode, item address data representing addresses of the items recorded on the cassette magnetic tape, recording position data indication positions on the cassette magnetic tape in each of which a new item is to be recorded, and so on, and to maintain the condition of automatically responding operation to be appropriate in accordance with the data stored the RAM.

The automatically answerable telephone apparatus having the control unit as described above, a power supply voltage is supplied to various circuit blocks and operating portions including the control unit by a power source circuit block in which an alternating current (AC) voltage from a commercial AC power produce a direct current (DC) voltage serving as the power supply voltage. Accordingly, when power failure occurs in the commercial AC power source, the power supply voltage is not obtained to be supplied to various circuit blocks and operating portions. If the power failure in the commercial AC power voltage source occurs when the automatically answerable telephone apparatus is set to operative in the information recording operation mode or the message recording operation mode selected under the condition of automatically responding operation, the control operation of the control unit is stopped and the RAM provided in the control unit loses to be reset the operating condition data, the operation mode data, the recorded item number data, the item address data, the recording position data and so on having been stored therein. Therefore, in the case where the automatically answerable telephone apparatus is maintained in the condition of automatically responding operation through the power failure, new items after the power failure are recorded, in a so-called overwriting manner, on a portion of the cassette magnetic tape where the items before the power failure have been recorded and thereby the items having been recorded on the cassette magnetic tape before the power failure are undesirably erased in the built-in cassette tape recording and reproducing device, when the power failure has passed over to recover the supply of AC voltage in the commercial AC power source.

Accordingly, to avoid the undesirable erasure of items on the cassette magnetic tape thus brought about, there has been proposed to arrange the automatically answerable telephone apparatus so as to detect the power failure raised in the commercial AC power source to produce a detection output signal and cancel the condition of automatically responding operation in response to the detection output signal.

However, in the case where the automatically answerable telephone apparatus is arranged, as described above, to cancel the condition of automatically responding operation when the power failure occurs in the commercial AC power source, the automatically responding function of the automatically answerable telephone apparatus can not be effectively performed when the power failure has passed over to recover the supply of AC voltage in the commercial AC power voltage source, though the undesirable erasure of items on the cassette magnetic tape is avoided.

OBJECTS AND SUMMARY OF THE INVENTION

Accordingly, it is an object of the present invention to provide an improved automatically answerable telephone apparatus operative selectively in a condition of automatically responding operation with a DC power supply voltage obtained by rectifying an AC voltage from a commercial AC power source under the control of a control unit operating in accordance with various control data stored in a RAM provided therein, which avoids the aforementioned problem and disadvantage encountered with the prior art.

Another object of the present invention is to provide an automatically answerable telephone apparatus operative selectively in a condition of automatically responding operation with a DC power supply voltage obtained an AC voltage from a commercial AC power source under the control of a control unit operating in accordance with various control data stored in a RAM provided therein, which can keep the data stored in the RAM not to be erased when power failure occurs in the commercial AC power source under a situation wherein the telephone apparatus is in the condition of automatically responding operation.

A further object of the present invention is to provide an automatically answerable telephone apparatus operative selectively in a condition of automatically responding operation with a DC power supply voltage obtained by rectifying an AC voltage from a commercial AC power source under the control of a control unit operating in accordance with various data stored in a RAM provided therein, which can reserve the condition of automatically responding operation when power failure occurs in the commercial AC power source under a situation wherein the telephone apparatus is in the condition of automatically responding operation and perform effectively an automatically responding function after the power failure has passed over to recover the supply of AC voltage in the commercial AC power source.

According to the present invention, there is provided an automatically answerable telephone apparatus comprising a line signal processor connected to a telephone line, a speech signal handling portion for supplying the line signal processor with a speech signal and receiving a received speech signal from the line signal processor, a recording and reproducing device provided for automatically responding operation operative to record the received speech signal from the line signal processor on a record medium and reproduce the received speech signal recorded on the record medium, a control unit having a rewritable memory device for storing control data and operative to control the line signal processor and the recording and reproducing device, a writable non-volatile memory device connected to the control unit, a power source portion for supplying the control unit, the writable non-volatile memory device and other operating portions with a power supply voltage, a capacitor connected to the power source portion for holding the power supply voltage, and a power failure detector for detecting power failure occurring in the power source portion, wherein the control unit is operative, with the power supply voltage discharged by the capacitor, to remove the other operating portions from the power source portion and to transfer control data for automatically responding operation from the rewritable memory device to the writable non-volatile memory device for preserving the control data for automatically responding operation when the power failure occurring in the power source portion is detected by the power failure detector.

In the automatically answerable telephone apparatus thus constituted in accordance with the present invention, the condition of automatically responding operation is set up under the control of the control unit which is operative to control the line signal processor and the recording and reproducing device for automatically responding operation in accordance with the data stored in the rewritable memory device provided in the control unit. Then, when power failure occurs in the power source portion under a situation wherein the telephone apparatus is in the condition of automatically responding operation, the operating portions other than the control unit and the writable non-volatile memory device are removed from the power source portion by the control unit so that power consumption at loads in relation to the power source portion is effectively reduced and the control data for the automatically responding operation are transferred from the rewritable memory device to the writable non-volatile memory device for preserving the control data for the automatically responding operation by the control unit operating with the power supply voltage discharged by the capacitor for holding the power supply voltage. Consequently, the control data stored in the rewritable memory device provided in the control unit are not erased, but preserved in the writable non-volatile memory device when the power failure occurs in the power source portion.

Further, when the power failure has passed to recover the supply of the power supply voltage in the power source portion, the control unit is operative to connect the operating portions other than the control unit and the writable non-volatile memory portion to the power source portion and shift the control data preserved in the writable non-volatile memory device into the rewritable memory device so that the condition of automatically responding operation is set up again under the control of the control unit accompanied with the rewritable memory device in which the control data are stored. Accordingly, the automatically responding operation is properly performed after the power failure raised in the power source portion.

The above, and other objects, features and advantages of the present invention will become apparent from the following detailed description taken in conjunction with the accompanying drawings.

BRIEF DESCRIPTION OF THE DRAWINGS

FIG. 2 is a flow chart showing an example of an operation program carried out in a control unit composed of a microcomputer in the embodiment shown in FIG. 1.

DESCRIPTION OF THE PREFERRED EMBODIMENT

Figure 1:
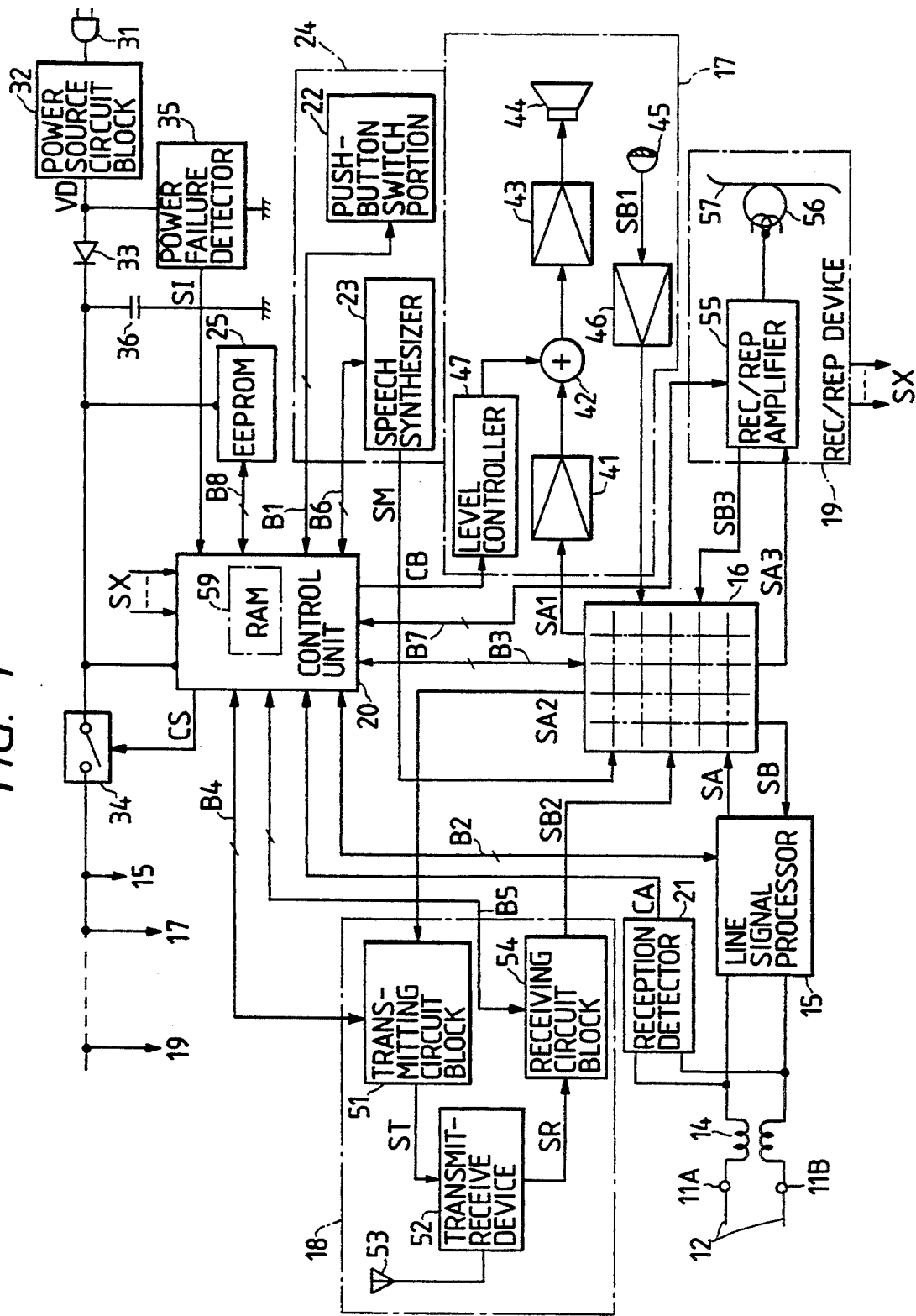
FIG. 1 is a circuit block diagram showing an embodiment of automatically answerable telephone apparatus according to the present invention.

FIG. 1 shows an embodiment of automatically answerable telephone apparatus according to the present invention, which is constituted in the wireless type and serves as a master apparatus for conducting radio communication with a terminal apparatus.

Referring to FIG. 1, a pair of line connecting terminals 11A and 11B are provided to be connected to a telephone line 12. A line signal processor 15 is connected through a line filter 14 to the line connecting terminals 11A and 11B. The line signal processor 15 is also connected to a cross-point switch device 16 with which a speech signal handling portion 17, a signal transmitting and receiving portion 18, and a recording and reproducing device 19 provided for automatically responding operation are coupled. Besides, a control unit 20 is provided for controlling each of the line signal processor 15, the cross-point switch device 16, the speech signal handling portion 17, the signal transmitting and receiving portion 18 and the recording and reproducing device 19.

A reception detector 21 is connected between the control unit 20 and the line signal processor 15. Further, a controlling portion 24 including push-button switch portion 22 and a writable non-volatile memory device (Electrically Erasable Programmable Read Only Memory: EEPROM) 25 is coupled with the control unit 20.

A power source circuit block 32 is coupled with a plug 31 connected to a commercial AC power source (not shown in the figure) for rectifying an AC voltage from the commercial AC power source to produce a DC power supply voltage VD. The DC power supply voltage VD from the power source circuit block 32 is supplied through a diode 33 to the control unit 20 and the writable non-volatile memory device 25 and also supplied through a switch 34 to various operating portions other than the control unit 20 and the writable non-volatile memory device 25. The switch 34 is caused to be normally in the ON state by a control signal CS supplied from the control unit 20. A power failure detector 35 is connected between the power source circuit block 32 and the diode 33 for detecting power failure raised in the commercial AC power source and producing a detection output signal SI to be supplied to the control unit 20, and a capacitor 36 is connected between the diode 33 and the switch 34 for holding the DC power supply voltage VD from the power source circuit block 32.

With such a configuration, when a condition of normal operation is set up, first, the push-button switch portion 22 in the controlling portion 24 is manipulated to input a call number for calling a person on the other end of the telephone line 12. The push-button switch portion 22 produces output data corresponding to the call number input thereby and supplies the control unit 20 with the output data through a data bus line B1. Thereby, call number data are supplied from the control unit 20 through a data bus line B2 to the line signal processor 15 and a call signal is forwarded from the line signal processor 15 through the line filter 14 and the line connecting terminals 11A AND 11B to the telephone line 12.

After that, a line signal from the person on the other end of the telephone line 12 who is called up by the call signal is supplied through the telephone line 12 to the line signal processor 15 and an input speech signal SA obtained from the line signal processor 15 is supplied to the cross-point switch device 16 which is connected through a data bus line B3 to the control unit 20 to operate under the control of the control unit 20. The cross-point switch device 16 is operative to supply the speech signal handling portion 17 with the input speech signal SA as a received speech signal SA1. In the speech signal handling portion 17, the received speech signal SA1 from the cross-point switch device 16 is supplied through an amplifier 41, an adder 42 and an amplifier 43 to a speaker 44 and a voice output based on the line signal from the person on the other end of the telephone line 12 is obtained from the speaker 44. Further, a speech signal SB1 obtained from a microphone 45 provided in the speech signal handling portion 17 is supplied through an amplifier 46 to the cross-point switch device 16. The cross-point switch device 16 is operative to supply the line signal processor 15 with the speech signal SB1 as an output speech signal SB. Then, a line signal obtained based on the output speech signal SB is forwarded from the line signal processor 15 through the line filter 14 and the line connecting terminals 11A and 11B to the telephone line 12.

The cross-point switch device 16 is further operative to supply the signal transmitting and receiving portion 18 with the input speech signal SA as a speech signal SA2. In the signal transmitting and receiving portion 18, the speech signal SA2 from the cross-point switch device 16 is supplied to a transmitting circuit block 51 which is connected through a data bus line B4 to the control unit 20 to operate under the control of the control unit 20. The transmitting circuit block 51 produces a transmissible signal ST based on the speech signal SA2 and the transmissible signal ST is supplied through a transmit-receive device 52 to an antenna 53 to be transmitted therefrom to the terminal apparatus.

In the signal transmitting and receiving portion 18, a transmitted signal SR from the terminal apparatus is received by the antenna 53 and supplied through the transmit-receive device 52 to a receiving circuit block 54 which is connected through a data bus line B5 to the control unit 20 to operate under the control of the control unit 20. The receiving circuit block 54 produces a speech signal SB2 based on the transmitted signal SR and the speech signal SB2 is supplied to the cross-point switch device 16. The cross-point device 16 is operative to supply the line signal processor 15 with the speech signal SB2 as the output speech signal SB. A line signal obtained based on the output speech signal SB is forwarded from the line signal processor 15 through the line filter 14 and the line connecting terminals 11A and 11B to the telephone line 12.

Then, in the case where the telephone apparatus shown in FIG. 1 is called up by a person on the other end of the telephone line 12, a call signal from another telephone apparatus connected to the other end of the telephone line 12 is supplied through the line connecting terminals 11A and 11B and the line filter 14 to each of the line signal processor 15 and the reception detector 21. Then, a detection output signal CA which is obtained in response to detection of the call signal is supplied from the reception detector 21 to the control unit 20. The control unit 20 produces a ring signal CB based on the detection output signal CA to be supplied to the speech signal handling portion 17. In the speech signal handling portion 17, the ring signal CB from the control unit 20 is supplied through a level controller 47, the adder 42 and the amplifier 43 to the speaker 44 and ring sound is generated by the speaker 44.

After that, an operating condition in which the received speech signal SA1 produced based on a line signal from the person on the other end of the telephone line 12 is supplied to the speaker 44 provided in the speech signal handling portion 17 and the line signal produced based on the speech signal SB1 from the microphone 45 provided in the speech signal handling portion 17 is forwarded to the telephone line 12 and an operating condition in which the transmissible signal ST produced based on the line signal from the person on the other end of the telephone line 12 is transmitted from the antenna 53 provided in the signal transmitting and receiving portion 18 to the terminal apparatus and the line signal produced based on the received signal SR received by the antenna 53 is forwarded to the telephone line 12, are set up respectively in the same manner as the operating conditions set up after the person on the other end of the telephone line 12 is called up.

On the other hand, when a condition of automatically responding operation is set up, first, a call signal from another telephone apparatus connected to the other end of the telephone line 12 is supplied through the telephone line 12, the line connecting terminals 11A and 11B and the line filter 14 to each of the line signal processor 15 and the reception detector 21. Then, the detection output signal CA which is obtained in response to detection of the call signal is supplied from the reception detector 21 to the control unit 20. The control unit 20 produces the ring signal CB based on the detection output signal CA to be supplied to the speech signal handling portion 17. In the speech signal handling portion 17, the ring signal CB from the control unit 20 is supplied through the level controller 47, the adder 42 and the amplifier 43 to the speaker 44 and the ring sound is generated by the speaker 44.

In the case where a responding operation mode is selected, a speech signal SM representing a predetermined respondent message is supplied from a speech synthesizer 23, which is connected through a data bus line B6 to the control unit 20 to operate under the control of the control unit 20, to the cross-point switch device 16. The cross-point switch device 16 is operative, under the control of the control unit 20, to supply the line signal processor 15 with the speech signal SM as the output speech signal SB. Thereby, the line signal obtained based on the output speech signal SB to represent the predetermined respondent message is transmitted from the line signal processor 15 through line filter 14 and the line connecting terminals 11A and 11B to the telephone line 12.

In the case where an information recording operation mode is selected, the speech signal SM representing a predetermined respondent message is supplied from the speech synthesizer 23 to the cross-point switch device 16. The cross-point switch device 16 is operative, under the control of the control unit 20, to supply the line signal processor 15 with the speech signal SM as the output speech signal SB, and thereby, the line signal obtained based on the output speech signal SB to represent the predetermined respondent message is transmitted from the line signal processor 15 through line filter 14 and the line connecting terminals 11A and 11B to the telephone line 12. Then, a line signal from the person on the other end of the telephone line 12 is supplied to the line signal processor 15 and the input speech signal SA obtained in the line signal processor 15 is supplied to the cross-point switch device 16. The cross-point switch device 16 is operative, under the control of the control unit 20, to supply the recording and reproducing device 19 with the input speech signal SA as a received speech signal SA3. In the recording and reproducing device 19, the received speech signal SA3 is supplied through a recording and reproducing amplifier 55, which is connected through a data bus line B7 to operate under the control of the control unit 20, to a magnetic head 56 so as to be recorded thereby on a cassette magnetic tape 57. Therefore, each information from the person on the other end of the telephone line 12 is recorded, together with other information, is successively recorded on the cassette magnetic tape 57.

Further, in the case where a message recording operation mode is selected, the input speech signal SA obtained from the line signal processor 15 based on a line signal which is supplied from the person on the other end of the telephone line 12 is supplied to the cross-point switch device 16. The cross-point switch device 16 is operative, under the control of the control unit 20, to supply the recording and reproducing device 19 with the input speech signal SA as the received speech signal SA3. In the recording and reproducing device 19, the received speech signal SA3 is supplied through the recording and reproducing amplifier 55 to the magnetic head 56 so as to be recorded thereby on the cassette magnetic tape 57. This recording of the received speech signal SA3 on the cassette magnetic tape 57 is started with a time point at which the detection output signal CA obtained from the reception detector 21 is supplied to the control unit 20.

When the received speech signal SA3 is recorded by the magnetic head 56 on the cassette magnetic tape 57 in the recording and reproducing device 19 under the condition of automatically responding operation, a group of detection output signals SX obtained in response to the operating condition of the recording and reproducing device 19 are supplied to the control unit 20. In the control unit 20 to which the group of detection output signals SX are supplied, operating condition data representing selectively one of the condition of normal operation and the condition of automatically responding operation, operation mode data representing selectively one of the responding operation mode, the information recording operation mode and the message recording operation mode selected under the condition of automatically responding operation, recorded item number data representing the number of items (information and messages) recorded on the cassette magnetic tape 57 under the information recording operation mode or the massage recording operation mode, item address data representing addresses of the items recorded on the cassette magnetic tape 57, recording position data indicating positions on the cassette magnetic tape 57 in each of which a new item is to be recorded, and so on, are stored in a RAM 59 contained in the control unit 20. These data stored in the RAM 59 are used for causing each of the line signal processor 15, the cross-point switch device 16, the recording and reproducing portion 17, and so on to operate properly under the condition of automatically responding operation.

When the items recorded on the cassette magnetic tape 57 are reproduced in the recording and reproducing device 19; the received speech signal SA3 recorded on the cassette magnetic tape 57 is read by the magnetic head 56 and a reproduced speech signal SB3 is obtained from the magnetic head 56 to be supplied through the recording and reproducing amplifier 55 to the cross-point switch device 16. The cross-point switch device 16 is operative, under the control of the control unit 20, to supply the speech signal handling portion 17 with the reproduced received speech signal SA3 as the received speech signal SA1. In the speech signal handling portion 17, the received speech signal SA1 from the cross-point switch device 16 is supplied through the amplifier 41, the adder 42 and the amplifier 43 to the speaker 44 and sound output corresponding to the items recorded on the cassette magnetic tape 57 is generated by the speaker 44.

If power failure occurs in the commercial AC power source to which the plug 31 is connected, the DC power supply voltage VD is not obtained from the power source circuit block 32. The power failure thus bringing about the stoppage of the DC power supply voltage VD is detected by the power failure detector 35 and a detection output signal SI indicating the power failure is supplied from the power failure detector 35 to the control unit 20. The control unit 20 to which the detection output signal SI is supplied is operative to stop the normal operation and instead to stop the supply of the control signal CS to the switch 34 so that the switch 34 is put in the OFF state and thereby various operating portions other than the control unit 20 and the writable non-volatile memory device 25 are removed from the cathode of the diode 33. As a result, power consumption in load in relation to the power source circuit block 32 is reduced.

Further, after stopping the supply of the control signal CS to the switch 34, the control unit 20 is operative with the DC power supply voltage discharged by the capacitor 36 to read the operating condition data, the operation mode data, the recorded item number data, the item address data, the recording position data, and so on from the RAM 59 provided therein. The data read from the RAM 59 are supplied through a data bus line B8 to the writable non-volatile memory device 25 which operates also the DC power supply voltage discharged by the capacitor 36 to be stored therein. The writing of the data read from the RAM 59 in the writable non-volatile memory device 25 is carried out completely within a period of time in which the capacitor 36 is in the discharging state, because the switch 34 is in the OFF state and the power consumption in load in relation to the power source circuit block 32 is effectively reduced. Therefore, the condition of automatically responding operation is maintained during the period of power failure.

After that, when the power failure has passed over to recover the supply of the AC voltage in the commercial AC power source, the DC power supply voltage VD is again obtained from the power source circuit block 32 and the detection output signal SI from the power failure detector 35 does not indicate the power failure. Accordingly, the control unit 20 resumes to supply the switch 34 with the control signal CS so as to cause the switch 34 to be in the ON state. The control unit 20 is operative further to read the data for the automatically responding operation from the writable non-volatile memory device 25 and supply the RAM 59 provided therein with the data read from the writable non-volatile memory device 25 to be stored therein through the data bus line B8. Then, the condition of automatically responding operation wherein the line signal processor 15, the cross-point switch device 16, the recording and reproducing device 19, and so on, are controlled by the control unit 20 in accordance with the data stored in the RAM 59, is properly set up again.

With the arrangement described above, when the power failure occurs in the commercial AC power source and thereby the DC power supply voltage is not obtained from the power source circuit block 32, the data for the automatically responding operation stored in the RAM 59 are not erased, but preserved in the writable non-volatile memory device 25 and the control unit 20 performs only timer operation, so that the condition of automatically responding operation is properly maintained during the power failure period. Accordingly, the control unit 20 can commence immediately to control the line signal processor 15, the cross-point switch device 16, the recording and reproducing device 19, and so on, for keeping the condition of automatically responding operation appropriate when the power failure has passed to recover the supply of the AC voltage to the power source circuit block 32.

The control unit 20 in the embodiment shown in FIG. 1 is constituted by, for example, a microcomputer and an example of control program carried out by the microcomputer for performing control operations under the condition of automatically responding operation will be explained below with reference to a flow chart shown in FIG. 2.

Referring to the flow chart shown in FIG. 2, first, in step 60, an operating condition flag F is initialized to be "0". Then, in step 61, it is checked, based on a detection output signal SI obtained from the power failure detector 35, whether power failure has occurred in the power source circuit block 32 or not. If the power failure has occurred in the power source circuit block, the normal operation is stopped in step 62, and then the supply of the control signal CS from the control unit 20 to the switch 34 is stopped so that the switch 34 is put in the OFF state, in step 63.

Next, in step 64, the data for the automatically responding operation which include the operating condition data, the operation mode data, the recorded item number data, the item address data and the recording position data, are read from the RAM 59 provided in the control unit 20, and the data read from the RAM 59 are supplied to the writable non-volatile memory device 25 to be stored therein. Then, in step 65, it is checked whether the shift of the data for the automatically responding operation from the RAM 59 to the writable non-volatile memory device 25 has finished or not. If the shift of the data has not been finished, the process returns to the step 64.

If it is clarified in the step 65 that the shift of the data has been finished, an operating condition in which only the timer operation is performed is set up, in step 66, and the operating condition flag F is set to be "1", in step 67. After that, the process returns to the step 61.

On the other hand, when it is clarified in the step 61 that the power failure has not occurred in the power source circuit block 32, it is checked whether the operating condition flag F is set to be "1" or not, in step 70. If the operating flag F is not set to be "1", the process returns to the step 61, and if the operating condition flag F is set to be "1", the process advances to step 71. In the step 71, the control signal CS is resumed to be supplied to the switch 34 so that the switch 34 is caused again to be in the ON state. Then, in step 72, the data for the automatically responding operation are read from the writable non-volatile memory device 25 and supplied to the RAM 59 provided in the control unit 20 to be stored therein.

Further, in step 73, the condition of automatically responding operation wherein the line signal processor 15, the cross-point switch device 16, the recording and reproducing device 19, and so on, are controlled by the control unit 20 in accordance with the data stored in the RAM 59, is properly set up again. Then, the operating condition flag F is set to be "0", in step 74, and the process returns to the step 61.

What is claimed is:

1. An automatically answerable telephone apparatus comprising:

line signal processing means connected to a telephone line, speech signal handling means for supplying the line signal processing means with a speech signal and receiving a received speech signal from the line signal processing means, recording and reproducing means provided for automatically responding operation and operative to record the received speech signal from the line signal processing means on a record medium and reproduce the received speech signal recorded on the record medium, control unit means having a rewritable memory device for storing control data and operative to control the line signal processing means and the recording and reproducing means, writable non-volatile memory means connected to the control unit means, power source means for supplying the control unit means, the writable non-volatile memory means and at least one of said line signal processing means, said speech signal handling means, and said recording and reproducing means with a power supply voltage, capacitor means connected to the power source means for holding the power supply voltage, and power failure detecting means for detecting power failure occurring in the power source means, wherein said control unit means is operative, with the power supply voltage discharged by said capacitor means, to remove at least one of said line signal processing means, said speech signal handling means, and said recording and reproducing means from the power source means and transfer control data for automatically responding operation from said rewritable memory device to said writable non-volatile memory means for preserving the control data for the automatically responding operation when the power failure occurring in said power source means is detected by said the power failure detecting means.

2. An automatically answerable telephone apparatus according to claim 1, wherein said speech signal handling means comprises a microphone for producing said speech signal and a speaker for generating sound output based on said received speech signal.

3. An automatically answerable telephone apparatus according to claim 1, wherein said recording and reproducing means comprises a recording and reproducing amplifier to which the received speech signal is supplied and a magnetic head connected to said recording and reproducing amplifier for recording the received speech signal on a cassette magnetic tape and reproducing the received speech signal recorded on the cassette magnetic tape.

4. An automatically answerable telephone apparatus according to claim 1, wherein said control unit means has a random access memory device constituting said rewritable memory device.

5. An automatically answerable telephone apparatus according to claim 1, wherein writable non-volatile memory means comprises an electrically erasable programmable read only memory device.

6. An automatically answerable telephone apparatus according to claim 1, wherein said power source means comprises a power source circuit block connected to an commercial AC power source for rectify an AC voltage from the commercial AC power source to produce the power supply voltage.

7. An automatically answerable telephone apparatus according to claim 1, wherein said capacitor means is connected through a diode to the power source means.

8. An automatically answerable telephone apparatus according to claim 1 further comprising switch means connected between said power source means and at least one of said line signal processing means, said speech signal handling means, and said recording and reproducing means and controlled by said control unit means selectively to couple at least one of said line signal processing means, said speech signal handling means, and said recording and reproducing means with said power source means and to remove at least one of said line signal processing means, said speech signal handling means, and said recording and reproducing means from said power source means.

9. An automatically answerable telephone apparatus according to claim 1 further comprising a cross-point switch means connected to said line signal processing means, said speech signal handling means and said recording and reproducing means for mediating the speech signal to said line signal processing means and the received speech signal to each of said speech signal handling means and said recording and reproducing means.

* * * * *